(12) United States Patent
Leconte et al.

(10) Patent No.: US 11,470,045 B2
(45) Date of Patent: Oct. 11, 2022

(54) COMMUNICATION SYSTEM AND METHOD FOR AN AIRCRAFT

(71) Applicants: Airbus Operations SAS, Toulouse (FR); Airbus Operations GmbH, Hamburg (DE)

(72) Inventors: Bertrand Leconte, Toulouse (FR); Pierre Attal, Larra (FR); Olaf Bischof, Butjadingen (DE); Stephan Marwedel, Hamburg (DE)

(73) Assignees: Airbus Operations SAS, Toulouse (FR); Airbus Operations GmbH, Hamburg (DE)

( * ) Notice: Subject to any disclaimer, the term of this patent is extended or adjusted under 35 U.S.C. 154(b) by 405 days.

(21) Appl. No.: 16/441,341

(22) Filed: Jun. 14, 2019

(65) Prior Publication Data
US 2019/0386958 A1    Dec. 19, 2019

(30) Foreign Application Priority Data
Jun. 19, 2018    (FR) ...................................... 18 55363

(51) Int. Cl.
*H04L 9/40* (2022.01)
*G06F 40/30* (2020.01)
*G08G 5/00* (2006.01)

(52) U.S. Cl.
CPC .......... *H04L 63/0245* (2013.01); *G06F 40/30* (2020.01); *G08G 5/0095* (2013.01); *H04L 63/029* (2013.01); *H04L 63/20* (2013.01)

(58) Field of Classification Search
CPC ... H04L 63/0245; H04L 63/029; H04L 63/20; G06F 40/30
See application file for complete search history.

(56) References Cited

U.S. PATENT DOCUMENTS 8,260,552 B2 * 9/2012 Jeerage ................... G01S 19/20
                                                      701/472
8,989,958 B2 * 3/2015 Ric ......................... H04L 67/12
                                                      701/31.4
(Continued)

FOREIGN PATENT DOCUMENTS

EP    1296252 A1    3/2003
EP    2428911 A2    3/2012

OTHER PUBLICATIONS

French Search Report; priority document.

*Primary Examiner* — Linglan Edwards
(74) *Attorney, Agent, or Firm* — Greer, Burns & Crain, Ltd.

(57) ABSTRACT

A communication system for an aircraft comprises a communication interface with the outside of the aircraft and an avionics domain of which the security level is the highest of the communication system. It also comprises a communication domain to which is connected the communication interface and of which the security level is lower than the security level of the avionics domain. A barrier of a first type is arranged to filter the information coming from the communication interface so as to allow the information to pass into the communication domain only if the information corresponds to an authenticated communication. A barrier of a second type is arranged to filter information transmitted from the communication domain to the avionics domain, carrying out at least a syntactic filtering of the information.

18 Claims, 3 Drawing Sheets

(56) References Cited

U.S. PATENT DOCUMENTS

| | | | |
|---|---|---|---|
| 10,529,240 B2* | 1/2020 | Whitlow | G08G 5/0052 |
| 10,911,403 B1* | 2/2021 | Delaney | H04L 63/1425 |
| 2003/0061568 A1 | 3/2003 | Dijkstra | |
| 2007/0115938 A1* | 5/2007 | Conzachi | B64F 5/60 |
| | | | 370/352 |
| 2009/0133112 A1* | 5/2009 | Kauffman | G08G 5/0013 |
| | | | 726/11 |
| 2009/0192659 A1* | 7/2009 | Beebe | G07C 5/008 |
| | | | 701/2 |
| 2011/0218701 A1* | 9/2011 | Ric | H04L 63/0245 |
| | | | 701/31.4 |
| 2012/0066751 A1 | 3/2012 | Nutaro et al. | |
| 2017/0285171 A1* | 10/2017 | Ries | G01S 19/215 |
| 2017/0289189 A1* | 10/2017 | Bush | H04L 63/1433 |
| 2018/0034834 A1* | 2/2018 | Mitchell | H04L 63/1416 |
| 2018/0086455 A1* | 3/2018 | Burch, V | G06Q 10/083 |
| 2018/0351914 A1* | 12/2018 | Jobson | H04L 63/105 |

\* cited by examiner

COMMUNICATION SYSTEM AND METHOD FOR AN AIRCRAFT

CROSS-REFERENCES TO RELATED APPLICATIONS

This application claims the benefit of the French patent application No. 1855363 filed on Jun. 19, 2018, the entire disclosures of which are incorporated herein by way of reference.

FIELD OF THE INVENTION

The present invention relates to a communication system and method for an aircraft, and to an aircraft comprising such a communication system.

BACKGROUND OF THE INVENTION

Modern aircraft, in particular transport airplanes, comprise avionics computers which aid the crew in flying the aircraft. For example, an aircraft generally comprises a flight management system (FMS) computer, a flight guidance (FG) computer, a flight control system (FCS) computer or primary (PRIM) and secondary (SEC) computers, etc. Since the functions carried out by the avionics computers can be essential for flying the aircraft, the various avionics computers are designed with redundancy in order to ensure that the functions are available, in accordance with the regulations in force. In order to carry out the various functions for which they are designed, these avionics computers exchange information with one another by means of a communication network of the aircraft. The avionics computers and this communication network thus form part of a communication system of the aircraft. In modern aircraft, this communication system generally comprises computers other than the avionics computers: it comprises, in particular, computers carrying out functions relating to the airline that operates the aircraft, in particular, a maintenance computer, for example of the centralized maintenance system (CMS) type, or a computer for managing the passenger cabin. The functions carried out by these other computers are functions that are non-essential, at least in the short term, for flying the aircraft. The avionics computers are grouped in a domain referred to as the avionics domain of which a required security level is the highest for the communication system of the aircraft, in order to guarantee that the operation of the functions carried out by the avionics computers is not at risk of disruption, whether voluntary or involuntary, by communication with equipment external to the avionics domain. The security level required for the other computers is lower than the security level required for the avionics domain. The communication system conforms, for example, to the standard ARINC 811 which defines various domains having various security levels in a communication system of an aircraft, in particular:
- an aircraft control domain (ACD) corresponding to the above-mentioned avionics domain;
- an airline information services domain (AISD) which comprises computers that carry out the functions relating to the airline (maintenance, cabin management, etc.);
- a passenger information and entertainment services domain (PIESD) relating to entertainment and information for passengers.

In accordance with the standard ARINC 811, the security level of the ACD domain corresponds to the highest security level of the communication system of the aircraft since the functions carried out by the computers of the ACD domain may be essential for controlling the flight of the aircraft. The security level of the AISD domain is lower than that of the ACD domain, since the functions carried out in the AISD domain are less essential, at least in the short term, for controlling the flight of the aircraft. The security level of the PIESD domain is lower than the security level of the AISD domain.

The exchange of information from a domain having a lower security level to a domain having a higher security level is very heavily restricted so as to not compromise the security of the domain having the highest security level. In particular, the transfer of information from the AISD domain to the ACD domain is heavily restricted so as to not compromise the security of the ACD domain. For example, when the aircraft receives, in the AISD domain, an aircraft flight plan update request from the airline operating the aircraft, in order to guarantee the security of the ACD domain the flight plan update cannot be transmitted automatically from the AISD domain to a FMS-type flight management computer located in the ACD domain. A pilot wishing to apply this update must select a flight plan modified accordingly by means of a human-machine interface of the ACD domain connected to the FMS flight management computer. This represents a workload for the pilot of the aircraft. In order to reduce the pilot's workload, it would be desirable to allow transmission to the avionics domain (or ACD), having the highest security level in the communication system, of information originating in a domain having a lower security level, while not, in the process, compromising the security of the avionics domain.

SUMMARY OF THE INVENTION

An aim of the present invention is to rectify the above-mentioned drawbacks. It relates to a communication system for an aircraft, the communication system comprising a communication interface with the outside of the aircraft and an avionics domain of which the security level is the highest of the communication system.

This communication system is noteworthy in that:
- the communication system comprises a so-called communication domain to which is connected the communication interface and of which the security level is lower than the security level of the avionics domain;
- the communication system comprises a barrier of a first type arranged to filter the information coming from the communication interface, this barrier of a first type being an authentication barrier configured to allow the information to pass into the communication domain only if it corresponds to an authenticated communication; and
- the communication system comprises a barrier of a second type arranged to filter information transmitted from the communication domain to the avionics domain, this barrier of a second type being configured to carry out at least a syntactic filtering of the information transmitted from the communication domain to the avionics domain.

Thus, when information is received by the communication interface, for example originating from the airline that operates the aircraft, the barrier of the first type means that this information can pass into the communication domain only if it is received by means of an authenticated communication. This makes it possible to avoid information originating from non-authenticated sources entering the communication domain. Moreover, if this information is intended to be transmitted to the avionics domain, the barrier of the second type serves to carry out syntactic filtering so as to allow the information to pass into the avionics domain only if it conforms to predefined syntax rules for this information. Thus, even when information is sent to the aircraft from an authenticated source, this information must conform to syntax rules in order to be passed on to the avionics domain. This information is then judged to be sufficiently trustworthy so as to not risk compromising the security of the avionics domain.

In particular, the communication system comprises:
  a set of communication interfaces with the outside of the aircraft, to which the communication interface belongs, all of the communication interfaces of the set of communication interfaces being connected to the communication domain; and
  one or more barriers of the first type, including the barrier of the first type, which are arranged so as to filter the information coming from each of the communication interfaces of the set of communication interfaces, this or these barrier(s) of the first type being configured to allow the information from a communication interface to pass into the communication domain only if this information corresponds to an authenticated communication.

According to one particular embodiment, the second barrier is further configured to carry out semantic filtering of the information transmitted from the communication domain to the avionics domain, this semantic filtering corresponding to permitting or preventing the transmission of the information from the communication domain to the avionics domain, depending on authorized ranges of values of the information.

According to another particular embodiment, the avionics domain comprises at least one item of avionics equipment of which an aircraft management function is configured to carry out semantic analysis of information received by the function, this semantic analysis corresponding to acceptance or rejection of the information by the function, depending on values of the information and on a context of the aircraft.

Advantageously, the avionics domain comprises:
  a so-called decision sub-domain connected to the communication domain, the decision sub-domain comprising avionics equipment carrying out functions of strategic management of the aircraft; and
  a so-called operational sub-domain connected to the decision sub-domain, the operational sub-domain comprising avionics equipment carrying out functions of tactical management of the aircraft,
  and the barrier of the second type is arranged such that the information which is transmitted from the communication domain to the avionics domain, and which passes the barrier of the second type, arrives in the decision sub-domain.

According to a first alternative, the decision sub-domain and the operational sub-domain are implemented by means of two distinct communication networks. The distinct networks are segregated, for example by means of at least one router or a "security machine."

According to a second alternative, the decision sub-domain and the operational sub-domain are implemented by means of a single communication network. In order to guarantee the segregation of the two sub-domains, a computer belonging to one of the two sub-domains does not belong to the other sub-domain.

In particular, the decision sub-domain comprises at least one item of avionics equipment configured to:
  acquire information received from the communication domain;
  determine transformed information as a function of the information received from the communication domain;
  transmit the transformed information to the operational sub-domain.

More particularly, the at least one item of avionics equipment is configured to acquire all of the information received from the communication domain and intended to be transmitted to the operational sub-domain, in order to determine the information transformed as a function of the information received from the communication domain and to transmit, to the operational sub-domain, the transformed information while excluding all non-transformed information received from the communication domain.

According to a first variant, the item of avionics equipment of which an aircraft management function is configured to carry out the semantic analysis is an item of avionics equipment of the decision sub-domain, and the aircraft management function is configured to transmit, to the operational sub-domain, only information accepted during the semantic analysis.

According to a second variant, the item of avionics equipment of which an aircraft management function is configured to carry out the semantic analysis is an item of avionics equipment of the operational sub-domain, and the aircraft management function is configured such that, when computing operational commands for the aircraft, it does not use the information rejected during the semantic analysis.

In a particular embodiment, the communication system further comprises a so-called environment domain to which are connected information sources of the aircraft of the radio navigation type, this environment domain being connected to the avionics domain, and the communication system comprises a barrier of the second type arranged to filter the information transmitted from the environment domain to the avionics domain, this barrier of the second type being configured to carry out syntactic filtering and/or semantic filtering of the information transmitted from the environment domain to the avionics domain.

In another particular embodiment, the communication system further comprises a so-called passenger domain, of which the security level is lower than the security level of the communication domain and to which are connected interfaces intended for connecting passenger electronic equipment in the cabin of the aircraft, the passenger domain being connected to the communication domain by a barrier of the first type, this barrier being configured to allow information from the passenger domain to pass into the communication domain only if it corresponds to an authenticated communication.

In yet another particular embodiment, the communication system further comprises a so-called free domain, to which is connected aircraft equipment carrying out functions that have no impact on the safety of the aircraft, the free domain being connected to the communication domain by a barrier of the first type, this barrier being configured to allow information from the free domain to pass into the communication domain only if it corresponds to an authenticated communication.

The invention also relates to a communication method for an aircraft comprising a communication system, the communication system comprising a communication interface with the outside of the aircraft and an avionics domain of which the security level is the highest of the communication system.

This method is noteworthy in that, the communication system comprising a so-called communication domain to which is connected the communication interface and of which the security level is lower than the security level of the avionics domain, the method comprises the following steps:
  filter the information coming from the communication interface by means of a barrier of a first type of the communication system, this barrier of a first type being an authentication barrier configured to allow the information to pass into the communication domain only if it corresponds to an authenticated communication; and
  filter information transmitted from the communication domain to the avionics domain by means of a barrier of a second type configured to carry out at least a syntactic filtering of the information transmitted from the communication domain to the avionics domain.

The invention also relates to an aircraft comprising a communication system as set out above.

BRIEF DESCRIPTION OF THE DRAWINGS

The invention will be better understood on reading the description which follows and on examining the appended figures.

DETAILED DESCRIPTION OF THE PREFERRED EMBODIMENTS

Figure 1:
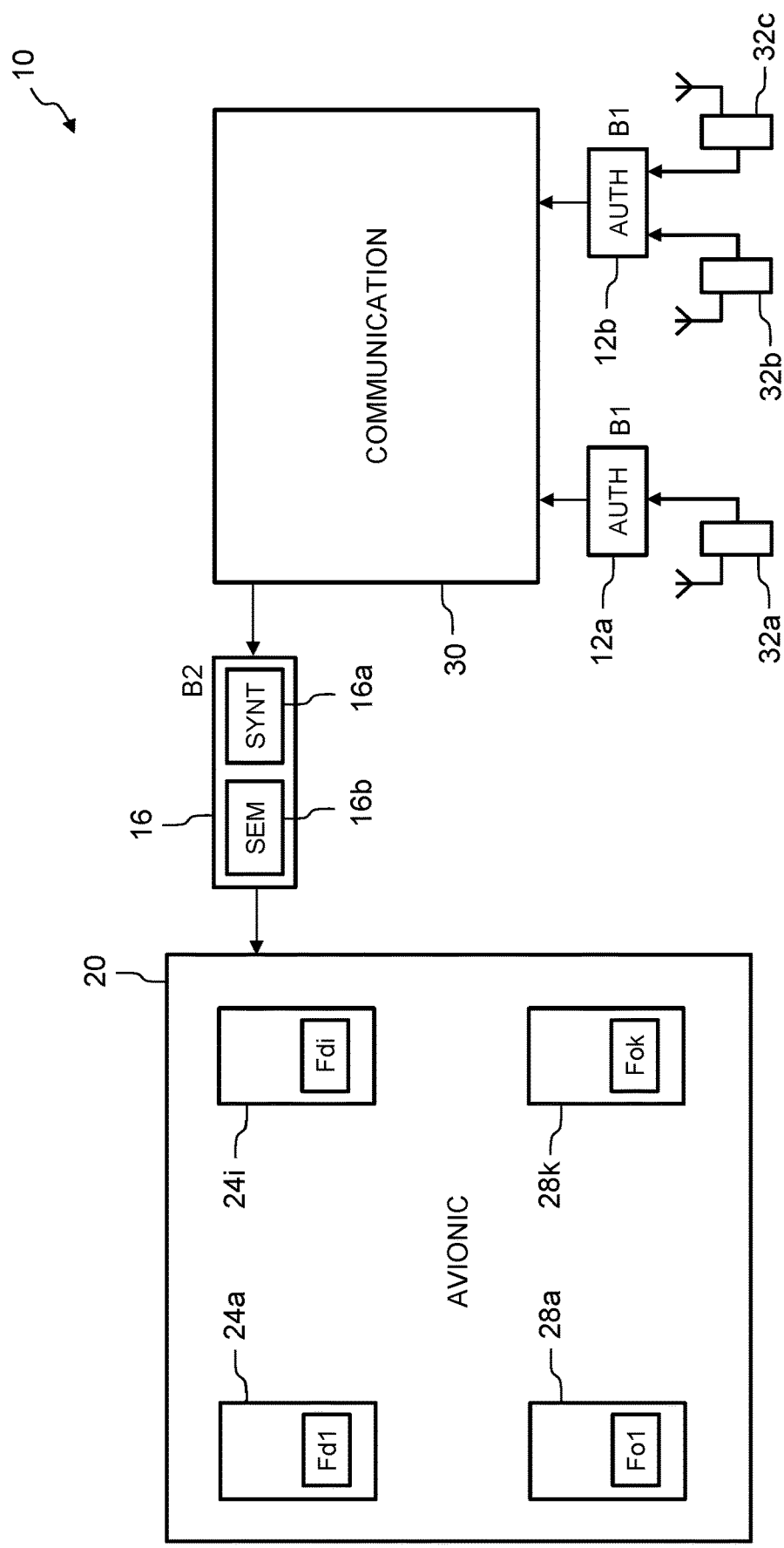
FIGS. 1 and 2 show, schematically, a communication system for an aircraft in accordance with two embodiments of the invention.
Figure 3:
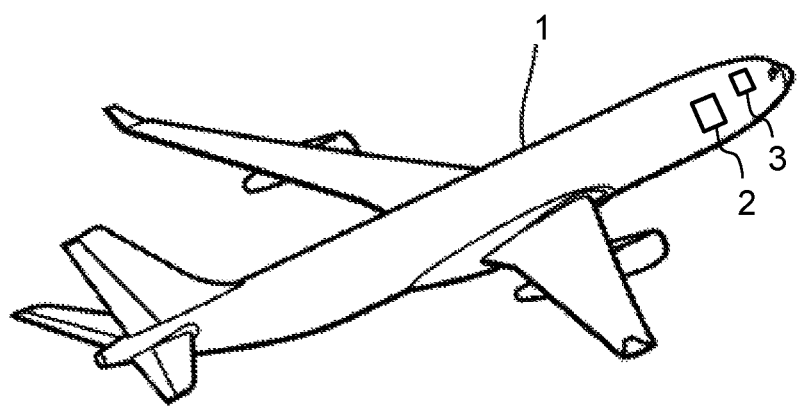
FIG. 3 illustrates, in a simplified manner, an aircraft comprising such a communication system.

An aircraft 1, shown in FIG. 3, comprises a communication system. This communication system 10, as shown in FIG. 1, comprises an avionics domain 20 (labelled AVIONIC in the figure), a communication domain 30 (labelled COMMUNICATION in the figure), a set of communication interfaces 32a, 32b, 32c, a set of barriers 12a, 12b of a first type (labelled B1 in the figure) and a barrier 16 of a second type (labelled B2 in the figure). The avionics domain 20 comprises a set of computers 24a, . . . , 24i, 28a, . . . , 28k that are configured to carry out a set of respective functions Fd1, . . . , Fdi, Fo1, . . . , Fok. Although, for reasons of clarity of the figure, only one function is represented for each computer, each computer can carry out a set of functions. The communication interfaces 32a, 32b, 32c correspond, for example, to units for transmitting and receiving data that are intended to allow data links between the aircraft and air control, or centers of operation of the airline operating the aircraft. The outputs of these communication interfaces are connected to the inputs of the barriers of the first type, the outputs of which are connected to the communication domain 30. For example, as shown in the figure, an output of the communication interface 32a is connected to an input of the barrier 12a of the first type, an output of which is connected to the communication domain 30. Similarly, an output of the communication interface 32b and an output of the communication interface 32c are connected to inputs of the barrier 12b of the first type, an output of which is connected to the communication domain 30. The communication system 10 is, for example, located in an avionics bay 2 of the aircraft.

The avionics domain 20 is a domain of which the security level is the highest of the communication system 10. The communication domain 30 is a domain of which the security level is lower than the security level of the avionics domain.

In operation, the communication interfaces 32a, 32b, 32c are able to receive information, for example from air control, or a center of operation of the airline operating the aircraft. In the exemplary case of receiving such information via the communication interface 32a, the communication interface 32a passes the information received thereby on to the barrier 12a of the first type. This barrier 12a is an authentication barrier, as indicated by the label AUTH in the figure. It corresponds, for example, to a gateway or to a router. The barrier 12a is configured to allow the information to pass into the communication domain 30 only if this information corresponds to an authenticated communication. To that end, the barrier 12a of the first type may use any technique known in the field of communication authentication, for example an identifier and a password, a cyclic redundancy code, a digital certificate, etc. If the information does not correspond to an authenticated communication, the barrier 12a does not allow this information to pass into the communication domain 30. If the received information corresponds to an authenticated communication, the barrier 12a passes this information on to the communication domain 30.

In the communication domain 30, an item of equipment (for example a router) or a set of equipment receives the information coming from the communication interface 32a via the barrier 12a. This item of equipment checks whether the information is destined for a computer (or computers) of the avionics domain. If that is the case, this item of equipment transmits this information to the barrier 16 of the second type. The barrier 16 carries out at least a syntactic filtering 16a of the information, as indicated by the label SYNT in the figure. During syntactic filtering, the barrier 16 checks whether the syntax of the information corresponds to a predefined syntax to which this information is supposed to conform. If the information does not conform to this predefined syntax, the barrier 16 does not pass it on to the avionics domain. If the information does conform to this predefined syntax, the barrier 16 passes it on to the avionics domain. The predefined syntax corresponds, for example, to a particular format of data frames corresponding to this information. Thus, by means of the invention, information received by the aircraft originating from a source external to the aircraft can only pass into the avionics domain after passing through a barrier 12a, 12b, 12c of the first type, then the barrier 16 of the second type. This assumes that this information is transmitted by means of an authenticated communication and that it conforms to the predefined syntax: consequently, the source of the information is granted permission to communicate with the aircraft and it conforms to the syntax of the information, which ensures a level of confidence in this information which is compatible with their use in the avionics domain so as to not compromise the security level of the avionics domain.

In one advantageous embodiment, the barrier 16 further carries out a semantic filtering 16b of the information, as indicated by the label SEM in the figure. This semantic filtering corresponds to a verification of the conformity of the values of the information, with respect to predefined authorized ranges of values for this information. For example, when an item of information corresponds to a destination of the aircraft, a range of authorized values may correspond to a list of authorized airports. When an item of information corresponds to a cruising altitude of the aircraft, a range of authorized values may correspond to an interval of cruising altitudes, for example [25000 ft-35000 ft] (approximately 7500 m-11500 m). Preferably, the ranges of authorized values are predefined so as to maintain the safety of the flight of the aircraft. In the above-mentioned examples, these ranges of values are, for example, chosen so as to avoid a destination of the aircraft that does not correspond to a known airport, or so as to avoid a cruising altitude of the aircraft that is not in accordance with the known airways. If the information received by the barrier 16 does not conform to the ranges of authorized values, the barrier 16 does not pass this information on to the avionics domain. If this information does conform to the ranges of authorized values, the barrier 16 passes this information on to the avionics domain. This semantic filtering serves to guarantee that the information received by the avionics domain does not risk compromising the safety of the flight of the aircraft since information that does not match the ranges of authorized values would be blocked by the barrier 16.

In one particular embodiment, the avionics domain 20 comprises at least one item of avionics equipment 24a, ..., 24i; 28a, ..., 28k of which an aircraft management function Fd1, ..., Fdi; Fo1, ..., Fok is configured to carry out semantic analysis of information received by the function, in particular, originating from the communication domain 30. This semantic analysis corresponds to acceptance or rejection of the information received by the function, depending, on one hand, on values of the information and, on the other hand, on a context of the aircraft. For example, when the information received by a navigation function of the aircraft (in particular part of an FMS computer for managing the flight of the aircraft) corresponds to a desired destination of the aircraft, the function takes into account a context of the aircraft in order to accept or reject this information. In this particular case, the context corresponds, for example, to a current position of the aircraft and to a current quantity of fuel available on board the aircraft. If the received information corresponds to a destination of the aircraft that is compatible with the current quantity of fuel available on board the aircraft, the navigation function accepts this received information. By contrast, if this information corresponds to a destination of the aircraft where reaching this destination would require a quantity of fuel greater than the current quantity of fuel available on board the aircraft, the navigation function rejects this information in order to maintain the safety of the flight of the aircraft. In another example, the information received by a navigation function of the aircraft corresponds to a modified flight plan for the aircraft. The context then corresponds for example, at least in part, to the relief of the terrain corresponding to this modified flight plan. This relief is for example stored in a terrain database on board the aircraft. The navigation function then checks whether the modified flight plan can be flown without a risk of the aircraft coming into contact with the corresponding relief. If that is the case, the navigation function accepts the received information. If not, if there is a risk of the aircraft coming into contact with the relief of the terrain, the navigation function rejects this information.

In one example of use of a communication system 10 in accordance with this embodiment, a center of operations on the ground of an airline operating the aircraft 1 wishes to send a modified flight plan to the aircraft 1. To that end, the center of operations sends this new flight plan to the aircraft by means of an authenticated communication link. The information corresponding to this new flight plan is, for example, received by the communication interface 32a. The barrier 12a checks whether the communication link is indeed authenticated and allows this information to pass into the communication domain only if the communication link is authenticated. This serves to guarantee that the information does indeed originate from a transmitter that is authorized to communicate with the aircraft for the purpose of sending it this information. Once the information has been received in the communication domain 30, it is sent to the barrier 16 of the second type in order that it be passed on to the avionics domain. The barrier 16 carries out syntactic filtering 16a which serves to allow the information to pass into the avionics domain only if it conforms to an expected format for a flight plan. This serves to avoid information, even information sent by an authorized transmitter, being able to disrupt the operation of an FMS computer for managing the flight of the aircraft, for which the information is intended. Advantageously, the barrier 16 also carries out a semantic filtering 16b and/or the FMS computer for which the information is intended in the avionics domain 20 carries out a semantic analysis of the received information. The semantic filtering and/or the semantic analysis correspond to checking that the new flight plan is not dangerous with respect to the context of the aircraft (relief, weather, etc.). Thus, information received by the aircraft must undergo multiple checks, which are successive and of different natures, before the aircraft can use it. This serves to guarantee the safety of the flight of the aircraft.

Figure 2:
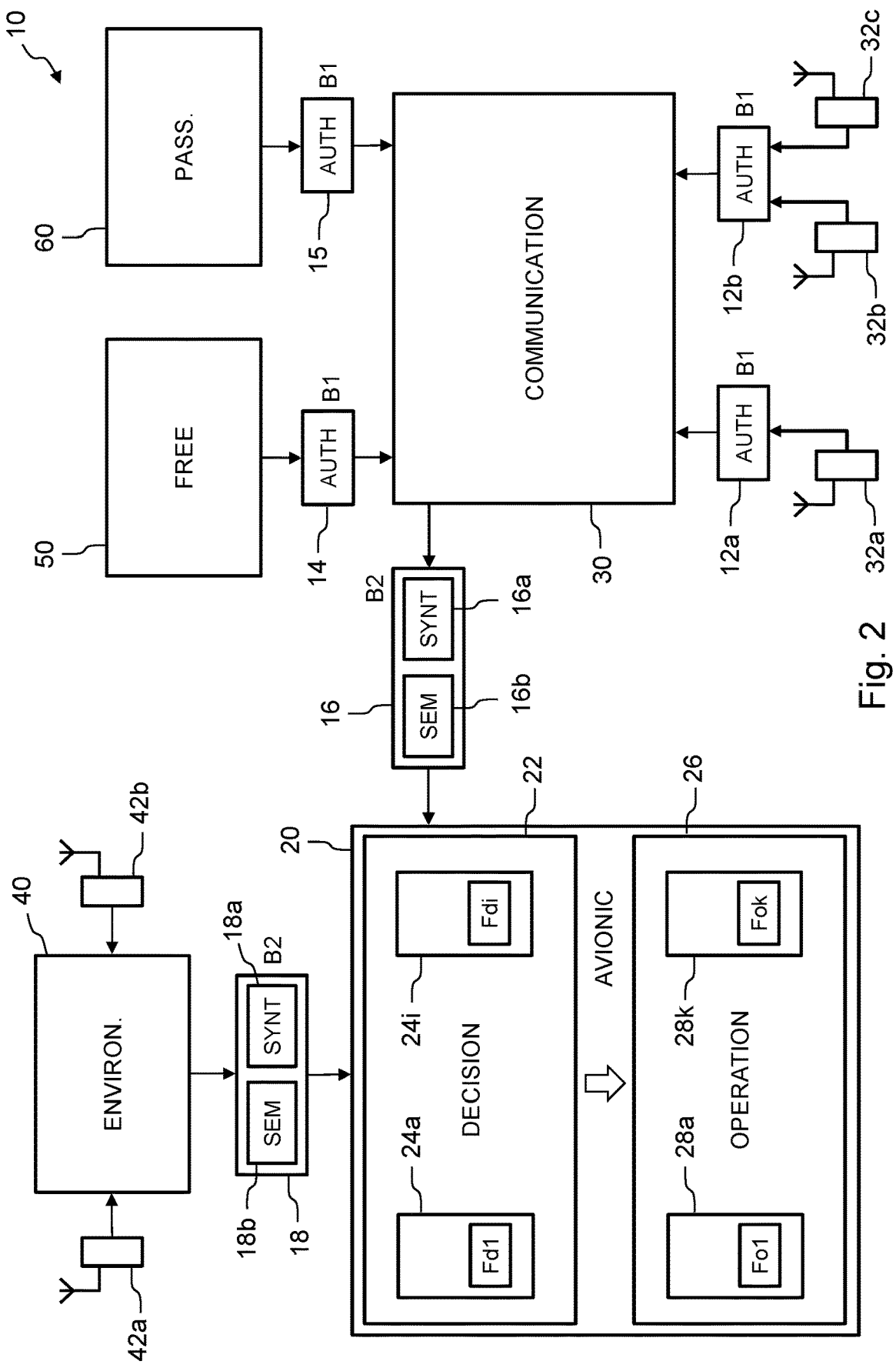

In one particular embodiment illustrated in FIG. 2, the avionics domain 20 comprises a so-called decision sub-domain 22 and a so-called operational sub-domain 26. The decision sub-domain 22 comprises avionics equipment 24a, ..., 24i that carries out functions Fd1, ..., Fdi of strategic management of the aircraft. These functions of strategic management of the aircraft are functions which affect the flight of the aircraft not in the short term (for example over several seconds) but in the medium term (for example over more than 10 minutes) or in the long term (for example over more than one hour). These functions correspond, for example, to the management of the future trajectory of the aircraft, without involving short-term actions on the flight controls of the aircraft. The operational sub-domain 26 comprises avionics equipment 28a, ..., 28k that carries out functions Fo1, ..., Fok of tactical management of the aircraft. These functions of tactical management of the aircraft are functions which act on the flight of the aircraft in the short term (for example from several seconds to several minutes). They act, for example, on the flight controls of the aircraft in order to control the control surfaces of the aircraft with the purpose of following a trajectory that corresponds to a current flight plan of the aircraft. The decision sub-domain 22 is connected to the communication domain 30 via the barrier 16 of the second type which is arranged such that the information which is transmitted from the communication domain 30 to the avionics domain 20, and which passes the barrier 16 of the second type, arrives in the decision sub-domain 22. The operational sub-domain 26 is connected to the decision sub-domain 22. Thus, the information coming from the communication domain 30 does not arrive directly in the operational sub-domain 26, the functions of which act in the short term on the flight of the aircraft. This makes it possible to protect the safety of the flight of the aircraft by not allowing information received by the avionics domain 20, originating from the communication domain 30, to be directly received by functions of tactical management of the aircraft: thus, there is no risk of the received information having a short-term influence on the flight of the aircraft.

In the above-mentioned example of the aircraft receiving a new flight plan, the FMS flight management computer is located in the decision sub-domain. When a new flight plan is received and accepted by this FMS computer, the computer transforms the information corresponding to this new flight plan into settings that it sends to the flight control computers located in the operational sub-domain 26. Thus, these flight control computers, which control actions (movements of control surfaces, etc.) that have a short-term impact on the flight of the aircraft, receive information which are assigned a very high level of confidence since this information is prepared by the FMS computer located in the avionics domain, on the basis of information that has undergone multiple successive checks as indicated above.

Advantageously, an item of avionics equipment 24a, . . . , 24i of the decision sub-domain 22 is configured to:
acquire information received from the communication domain 30 via the barrier 16 of the second type;
determine transformed information as a function of the information received from the communication domain;
transmit the transformed information to the operational sub-domain 26.

Thus, the operational sub-domain 26 receives information transformed in the decision sub-domain 22 rather than information similar to that received from the communication domain 30. Given that the decision sub-domain 22 forms part of the decision domain 20, the level of confidence that can be assigned to the information transformed in this decision sub-domain 22 is high. For example, when the decision sub-domain 22 receives a flight plan (corresponding to a sequence of waypoints) from the communication domain 30 via the barrier 16 of the second type, an item of avionics equipment 24a, . . . , 24i of the decision sub-domain 22 determines a trajectory for the aircraft corresponding to this flight plan, the trajectory allowing the aircraft to pass through the various waypoints of the flight plan. The item of avionics equipment 24a, . . . , 24i of the decision sub-domain 22 sends this trajectory to the operational sub-domain 26. Thus, the operational sub-domain 26 does not directly receive the flight plan from the communication domain 30, but rather receives a trajectory prepared by the avionics equipment of the decision sub-domain 22.

Furthermore, when the item of avionics equipment 24a, . . . , 24i which transforms the information in the decision sub-domain 22 also comprises a function Fd1, . . . , Fdi carrying out a semantic analysis of information received from the communication domain 30, as indicated previously, the information transformed by this item of avionics equipment has a confidence level that is higher still, which guarantees an even better level of safety of the flight of the aircraft. Indeed, as indicated previously, information which is received from the communication domain 30 and which could present a risk for the flight of the aircraft is rejected during the semantic analysis. Thus, the transformed information transmitted to the operational sub-domain 26 is based only on information accepted during the semantic analysis.

Advantageously, only information transformed in the decision sub-domain 22 is sent from the decision sub-domain 22 to the operational sub-domain 26. Thus, the operational sub-domain 26 receives only information that has been previously transformed in the decision sub-domain 22, excluding all non-transformed information received from the communication domain. This serves to guarantee a high level of security of the operational sub-domain 26.

The avionics equipment 24a, . . . , 24i of the decision sub-domain 22 is advantageously distinct from the avionics equipment 28a, . . . , 28k of the operational sub-domain 26, which permits better segregation of the two sub-domains and thus better protection of the operational sub-domain 26 with respect to the information received from the communication domain 30: there is no risk of this information received from the communication domain 30 arriving unforeseen in the operational sub-domain 26. Only the information transformed in the decision sub-domain 22 can arrive in the operational sub-domain 26.

In one embodiment, the communication system further comprises a domain 40, referred to as the environment domain, as shown in FIG. 2. This environment domain is a domain to which are connected information sources of the aircraft 42a, 42b of the radio navigation type. One information source of the radio navigation type corresponds for example to one of the following types of source:
a receiver for a GNSS (Global Navigation Satellite System) satellite localizing system, for example a GPS (Global Positioning System) system;
a DME (Distance Measurement Equipment) receiver;
an ILS (Instrument Landing System) type receiver;
etc.

These information sources of the radio navigation type have the characteristic of providing information relating to the environment of the aircraft (position, altitude, etc.) based on these information sources receiving electromagnetic signals. The information provided by these information sources is intended to be used by equipment of the avionics domain 20. It is desirable to protect the aircraft from erroneous information that might be provided by these information sources in the event of voluntary or involuntary disruption of the electromagnetic signals received by these information sources. To that end, the communication system 10 is such that the environment domain 40 is connected to the avionics domain 20 and the communication system comprises a barrier 18 of the second type arranged to filter the information transmitted from the environment domain 40 to the avionics domain 20. This barrier of the second type is configured to carry out syntactic filtering 18a and/or semantic filtering 18b of the information sent from the environment domain to the avionics domain. This syntactic and/or semantic filtering is similar to that already described for the barrier 16 located between the communication domain 30 and the avionics domain 20. Thus, the barrier 18 serves to protect the safety of the flight of the aircraft by preventing the ingress, into the avionics domain 20, of information originating from the radio navigation sources 42a, 42b which could compromise the safety of the flight of the aircraft.

Furthermore, in the particular embodiment in which at least one item of avionics equipment 24a, . . . , 24i; 28a, . . . , 28k of the avionics domain 20 comprises a function of management of the aircraft configured to carry out a semantic analysis of information received by the function, this semantic analysis may apply not only to the information received in the avionics domain 20 originating from the communication domain 30, but also to the information received in the avionics domain 20 originating from the environment domain 40. This semantic analysis corresponds to acceptance or rejection of the information received by the function, depending on one hand on values of the information and on the other hand on a context of the aircraft. For example, when the avionics domain 20 receives, from the environment domain 40, information relating to the current position of the aircraft, including a current altitude of the aircraft, originating from a GPS satellite positioning system, an item of avionics equipment of the avionics domain 20 compares the current altitude with an altitude of the aircraft measured by a radio altimeter of the aircraft. The radio altimeter is a self-contained piece of equipment on board the aircraft: it is considered to be reliable and forms part of the avionics domain 20. The altitude of the aircraft measured by the radio altimeter is consequently considered to correspond to a context of the aircraft. If the current altitude of the aircraft provided by the GPS system does not correspond to the altitude of the aircraft measured by the radio altimeter, then the avionics equipment rejects the current aircraft position information provided by the GPS system. If the current altitude of the aircraft provided by the GPS system does correspond to the altitude of the aircraft measured by the radio altimeter, then the avionics equipment accepts the current aircraft position information provided by the GPS system.

In one embodiment, the communication system further comprises a domain 60, referred to as the passenger domain, as shown in FIG. 2. The passenger domain is a domain to which are connected interfaces intended for connecting passenger electronic equipment in the cabin of the aircraft. The level of security of the passenger domain is lower than the level of security of the communication domain, given that it is essentially intended for the entertainment of the passengers and that it is not possible to act on the aircraft from the equipment of the passenger domain. The passenger domain 60 is connected to the communication domain 30 so as to make it possible to display, on the passenger electronic equipment, information relating to the flight of the aircraft (such as a current position of the aircraft). In order to protect the level of security of the communication domain 30, the passenger domain 60 is connected to the communication domain 30 by a barrier 15 of the first type. This barrier is configured to allow information from the passenger domain 60 to pass into the communication domain 30 only if it corresponds to an authenticated communication.

In one embodiment, the communication system 10 further comprises a domain 50, referred to as the free domain, as indicated with the label FREE in FIG. 2. This free domain is a domain to which is connected equipment of the aircraft carrying out functions that have no impact on the safety of the aircraft, at least over the short or medium term. These functions relate, for example, to maintenance of the aircraft, management of the passenger cabin, etc. The free domain 50 is connected to the communication domain 30 by a barrier 14 of the first type. This barrier is configured to allow information from the free domain to pass into the communication domain only if it corresponds to an authenticated communication. For example, a maintenance operator connects a maintenance terminal to a communication port of the free domain 50. The maintenance terminal can thus communicate with a maintenance computer of the aircraft, for example also located in the free domain 50. This maintenance computer is, for example, of the CMS (Central Maintenance System) type. In order to carry out maintenance operations, it is sometimes necessary for the maintenance computer to communicate with computers of the avionics domain 20 (for example in order to acquire information, to move control surfaces of the aircraft when the aircraft is parked on the ground, etc.). To that end, the maintenance operator must establish an authenticated communication which confirms an authorization to carry out maintenance operations on the aircraft. The barrier 14 allows information originating from the maintenance computer to pass into the communication domain 30 only if this information corresponds to the authenticated communication. Thus, there is no risk of an unauthorized operator establishing such a communication: such an operator cannot send information to the communication domain, thus making it possible to maintain the security level of the communication domain. When an authenticated communication is established, if it is necessary for information to be sent to the avionics domain 20, this information is checked by the barrier 16 which carries out a syntactic filtering and possibly a semantic filtering. In some of the above-mentioned embodiments, functions of the equipment of the avionics domain also carry out a semantic analysis of the received information. The semantic filtering and/or the semantic analysis are, for example, configured such that information originating from the maintenance terminal is rejected when the context is such that the aircraft is in flight, so as to not compromise the safety of the flight of the aircraft. Information of this type is accepted only when the aircraft is parked on the ground.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A communication system for an aircraft, comprising:
a communication interface with the outside of the aircraft;
an avionics domain of which a security level is a highest of the communication system;
a communication domain, to which is connected said communication interface, and of which the security level is lower than the security level of the avionics domain;
a barrier of a first type configured to filter information coming from the communication interface, this first type barrier being an authentication barrier configured to allow said information to pass into the communication domain only if the information corresponds to an authenticated communication; and
a barrier of a second type arranged to filter information transmitted from the communication domain to the avionics domain, this second type barrier being configured to carry out at least a syntactic filtering of said information transmitted from the communication domain to the avionics domain,
wherein the avionics domain comprises at least one item of avionics equipment of which flight management function is configured to carry out semantic analysis of information received by said function, this semantic analysis comprising comparing said information to a flight aspect of the aircraft to determine an impact on the aircraft and determining an acceptance or a rejection of said information by said function based on the determined impact of said information to the flight aspect of the aircraft.

2. The communication system according to claim 1, further comprising:
- a set of communication interfaces with an outside of the aircraft, to which said communication interface belongs, all of the communication interfaces of the set of communication interfaces being connected to the communication domain; and
- one or more barriers of the first type, including said barrier of the first type, which are arranged so as to filter the information coming from each of the communication interfaces of the set of communication interfaces, this one or more barriers of the first type being configured to allow the information from a communication interface to pass into the communication domain only if this information corresponds to an authenticated communication.

3. The communication system according to claim 1, wherein the barrier of the second type is further configured to carry out semantic filtering of the information transmitted from the communication domain to the avionics domain, this semantic filtering corresponding to permitting or preventing a transmission of the information from the communication domain to the avionics domain, depending on authorized ranges of values of said information.

4. The communication system according to claim 1, wherein the avionics domain comprises:
- a decision sub-domain connected to the communication domain, the decision sub-domain comprising avionics equipment carrying out functions of strategic management of a flight aspect of the aircraft; and
- an operational sub-domain connected to the decision sub-domain, the operational sub-domain comprising avionics equipment carrying out functions of tactical management of the aircraft, and
- wherein the barrier of the second type is arranged such that the information which is transmitted from the communication domain to the avionics domain, and which passes the barrier of the second type, arrives in the decision sub-domain.

5. The communication system according to claim 4, wherein the decision sub-domain comprises at least one item of avionics equipment configured to:
- acquire information received from the communication domain;
- determine transformed information as a function of the information received from the communication domain;
- transmit the transformed information to the operational sub-domain.

6. The communication system according to claim 5, wherein said at least one item of avionics equipment is configured to acquire all of the information received from the communication domain and intended to be transmitted to the operational sub-domain, in order to determine the information transformed as a function of said information received from the communication domain and to transmit, to the operational sub-domain, the transformed information while excluding all non-transformed information received from the communication domain.

7. The communication system according to claim 4, wherein the item of avionics equipment of which the flight management function is configured to carry out said semantic analysis is an item of avionics equipment of the decision sub-domain, and wherein said flight management function is configured to transmit, to the operational sub-domain, only information accepted during the semantic analysis.

8. The communication system according to claim 4, wherein the item of avionics equipment of which the flight management function is configured to carry out said semantic analysis is an item of avionics equipment of the operational sub-domain, and said flight management function is configured such that, when computing operational commands for the aircraft, said flight management function does not use the information rejected during the semantic analysis.

9. The communication system according to claim 1, further comprising an environment domain to which are connected information sources of the aircraft of a radio navigation type, this environment domain being connected to the avionics domain, and wherein the communication system comprises a barrier of the second type arranged to filter the information transmitted from the environment domain to the avionics domain, this barrier of the second type being configured to carry out at least one of syntactic filtering or semantic filtering of said information transmitted from the environment domain to the avionics domain.

10. The communication system according to claim 1, further comprising a passenger domain, of which the security level is lower than the security level of the communication domain and to which are connected interfaces intended for connecting passenger electronic equipment in a cabin of the aircraft, the passenger domain being connected to the communication domain by a barrier of the first type, this barrier being configured to allow information from the passenger domain to pass into the communication domain only if the information corresponds to an authenticated communication.

11. The communication system according to claim 1, further comprising a free domain, to which is connected aircraft equipment carrying out functions that have no impact on a safety of the aircraft, the free domain being connected to the communication domain by a barrier of the first type, this barrier being configured to allow information from the free domain to pass into the communication domain only if the information corresponds to an authenticated communication.

12. An aircraft comprising a communication system according to claim 1.

13. A communication method for an aircraft comprising a communication system, the communication system comprising a communication interface with an outside of the aircraft and an avionics domain of which a security level is a highest of the communication system, wherein the communication system comprises a communication domain to which is connected said communication interface and of which a security level is lower than the security level of the avionics domain, the method comprising the following steps:
- filtering information coming from the communication interface by means of a barrier of a first type of the communication system, this barrier of the first type being an authentication barrier configured to allow said information to pass into the communication domain only if the information corresponds to an authenticated communication; and
- filtering information transmitted from the communication domain to the avionics domain by means of a barrier of a second type configured to carry out at least a syntactic filtering of said information transmitted from the communication domain to the avionics domain,
- wherein the avionics domain comprises at least one item of avionics equipment of which a flight management function is configured to carry out semantic analysis of information received by said function, this semantic analysis comprising comparing said information to a flight aspect of the aircraft to determine an impact on the aircraft and determining an acceptance or a rejection of said information by said function based on the determined impact of said information to the flight aspect of the aircraft.

14. A communication system for an aircraft, comprising:
a communication interface with the outside of the aircraft;
an avionics domain of which a security level is a highest of the communication system;
a communication domain, to which is connected said communication interface, and of which the security level is lower than the security level of the avionics domain;
a barrier of a first type configured to filter information coming from the communication interface, this first type barrier being an authentication barrier configured to allow said information to pass into the communication domain only if the information corresponds to an authenticated communication; and
a barrier of a second type arranged to filter information transmitted from the communication domain to the avionics domain, this second type barrier being configured to carry out at least a syntactic filtering of said information transmitted from the communication domain to the avionics domain by comparing said information to a flight aspect of the aircraft to determine an impact on the aircraft and determining an acceptance or a rejection of said information by said second type barrier based on the determined impact of said information to the flight aspect of the aircraft,
wherein the avionics domain comprises:
a decision sub-domain connected to the communication domain, the decision sub-domain comprising avionics equipment carrying out functions of flight management of a flight aspect of the aircraft; and
an operational sub-domain connected to the decision sub-domain, the operational sub-domain comprising avionics equipment carrying out functions of tactical management of the aircraft, and
wherein the barrier of the second type is arranged such that the information which is transmitted from the communication domain to the avionics domain, and which passes the barrier of the second type, arrives in the decision sub-domain.

15. The communication system according to claim 14, wherein the decision sub-domain comprises at least one item of avionics equipment configured to:
acquire information received from the communication domain;
determine transformed information as a function of the information received from the communication domain;
transmit the transformed information to the operational sub-domain.

16. The communication system according to claim 15, wherein said at least one item of avionics equipment is configured to acquire all of the information received from the communication domain and intended to be transmitted to the operational sub-domain, in order to determine the information transformed as a function of said information received from the communication domain and to transmit, to the operational sub-domain, the transformed information while excluding all non-transformed information received from the communication domain.

17. The communication system according to claim 14,
wherein the avionics domain comprises at least one item of avionics equipment of which flight management function is configured to carry out semantic analysis of information received by said function, this semantic analysis corresponding to acceptance or rejection of said information by said function, depending on values of said information and on a context of a flight aspect of the aircraft,
wherein the item of avionics equipment of which the flight management function is configured to carry out said semantic analysis is an item of avionics equipment of the decision sub-domain, and
wherein said flight management function is configured to transmit, to the operational sub-domain, only information accepted during the semantic analysis.

18. The communication system according to claim 14,
wherein the avionics domain comprises at least one item of avionics equipment of which the flight management function is configured to carry out semantic analysis of information received by said function, this semantic analysis corresponding to acceptance or rejection of said information by said function, depending on values of said information and on a context of a flight aspect of the aircraft,
wherein the item of avionics equipment of which the flight management function is configured to carry out said semantic analysis is an item of avionics equipment of the operational sub-domain, and said flight management function is configured such that, when computing operational commands for the aircraft, said flight management function does not use the information rejected during the semantic analysis.

* * * * *